United States Patent Office 3,686,001
Patented Aug. 22, 1972

3,686,001
FLAVORED READY-TO-EAT BREAKFAST CEREAL
George Christianson, Wayzata, Minn., assignor to
General Mills, Inc.
No Drawing. Filed June 27, 1969, Ser. No. 837,346
Int. Cl. A23l 1/10
U.S. Cl. 99—83                                7 Claims

ABSTRACT OF THE DISCLOSURE

A flavored ready-to-eat breakfast cereal comprised of separate units of a ready-to-eat cereal and a readily soluble puffed sugar body with the sugar body impregnated with the desirable flavor components.

---

The product of this invention is a flavored ready-to-eat breakfast cereal. Cereals of the ready-to-eat breakfast cereal type usually have a flavor characteristic of the grains employed and the processing used. Usually the flavor profile includes salt and sugar and may, or may not, include fat. Sucrose as well as other conventional sweeteners may be coated or enrobed on the surface of the cereal to give the ready-to-eat breakfast cereal a sweetened taste. This invention is particularly directed to those types of flavoring substances which produce flavors not conventional to a processed grain product. Examples of these are: fruit flavors, chocolate, root beer, cinnamon, caramel, butterscotch, and the like.

There have been many attempts in the past to incorporate these "alien" flavors into a ready-to-eat breakfast cereal. These attempts have not been entirely successful for a variety of reasons. When fruit flavors have been desired, one of the approaches customarily has been to add the fruit itself to the product. This has many difficulties in that there is only a small variety of fruits which will withstand the long storage periods commonly encountered in the marketing of breakfast cereals. Attempts to use dried fruits add substantially to the cost of the cereal in view of the cost of the fruits themselves and the drying process. Another approach which has been used is to enrobe the flavoring components (fruit, chocolate or other flavors) on the surface of the cereal product. This approach also has problems. This is particularly a problem when the amount of coating is limited. There is a limited amount of flavoring material which may be applied to the surface of the product. Therefore the resultant taste engendered by these materials is extremely mild and not of a sufficient degree of intensity to be satisfactory. Moreover, the flavoring and coloring materials used tend to leach out into the milk and discolor it when the product is served. If flavoring material is mixed with the cereal dough it is then damaged during the heating steps associated with processing.

The product of my invention helps to overcome the aforementioned difficulties. My invention is comprised of a combination of any ready-to-eat cereal and a structurally rigid puffed sugar body having flavoring material incorporated within it. For purposes of simplicity hereafter the term "base cereal" will refer to any ready-to-eat breakfast cereal. The term "combination breakfast cereal" will apply to the combination product of this invention, i.e., the puffed, impregnated sugar bodies and a base cereal.

It has now been found that by impregnating all or most of the desired flavoring component within a readily soluble and dispersible puffed sugar body and incorporating these sugar bodies with an aliquot ready-to-eat breakfast cereal it is possible to provide almost any flavor level desired. When these sugar bodies are mixed with milk, cream or other typical liquid used in conjunction with a base cereal, they disperse or dissolve thus freeing the flavor component into the liquid. The flavoring and coloring components become thoroughly mixed with the liquid and impart the flavoring and coloring characteristics to the liquid itself. Since the relative proportion of the sugar bodies can be large, the milk used can take on a rich color and flavor as compared with the situation in which the flavor and coloring is used as a coating on the cereal pieces.

One of the unique advantages of the utilization of these puffed sugar bodies is the fact that the intensity of the flavored ready-to-eat breakfast cereal in milk may be varied over fairly broad limits depending on whether the flavor is added to the base cereal as well as the sugar bodies, the ratio of sugar bodies to base cereal and the level of the addition of the flavoring materials to the sugar bodies themselves.

One variant of the product of my invention, includes making the puffed sugar body in such a way that the sugar body also contains a thickening agent. When the thickener and flavoring component dissolve in the milk or cream, the liquid becomes a milk shake-like product.

It is also possible to fortify these sugar bodies with vitamins, minerals, and other nutrients, so that a complete diet type of product can be formed when milk is added.

It is, of course, possible to combine the flavoring in the puffed sugar bodies with a flavored coating on the particular base cereal used. This idea may be used to produce for example, a mildly flavored cocoa base cereal in a "chocolate milk" or "milk shake" enrivonment.

The product of this invention is comprised of (1) a puffed sugar body which contains flavoring, and may contain coloring and/or a thickening agent and (2) a base cereal. The base cereal may be any flavored or unflavored cereal. Typical of the products which may be used in the present invention are those made in accordance with the Collatz Pat. No. 2,162,376, hereby incorporated by reference. The Collatz patent describes a method for making breakfast cereals including the steps of forming a dough of one or more grains, cooking the dough at an elevated temperature for the desired length of time, forming the dough generally by extrusion, cutting the extrusion product into pellets and drying and explosively puffing the pellets.

The cereal base products made according to the above general described method frequently have their three dimensions of the same general order of magnitude and thus are spherical or generally cubic in shape. In other instances one dimension may be considerably smaller than the others as, for example, in the case of a ring-shaped cereal piece or in the case of a disk of substantial thickness.

By other processes, such as flake making processes, it is possible to get cereal pieces in which one dimension is extremely small as compared to the others. Such flakes may be used in the present invention. Preferred products of the present invention, however, are those in which the cereal pieces are not flakes or similar shapes but rather have shapes in which there is not the great disparity in dimension as exists in the case of flakes. Preferred products are those in which the sugar bodies and the base cereal pieces either have similar shapes or shapes which are not materially different in volume.

The basic ingredient for the sugar body is of course, sugar. By sugar I mean any of the mono or di-saccharide materials either modified or unmodified commonly used or naturally occurring in food products. Examples of these sugars are maltose, lactose, levulose, dextrose, sucrose and invert syrup. Although any sugar may be used, I prefer to use sucrose for at least part of the puffed sugar body. I prefer sucrose because of its fairly high sweetness level per unit weight and for economic reasons. It is preferred to use sucrose in combination with other sugars. The reasons for this is that any of the sugar materials existing in its pure state will have a greater tendency to crystallize than a mixture of sugars. As will be pointed out subsequently, crystallization control is an important aspect of the manufacture of the puffed sugar bodies. Corn syrup or corn syrup derived products are the preferred sugars to be used in combination with sucrose because they are cheap and readily available.

The preferred flavoring materials are those flavors either natural or artificial such as fruit flavors, mint, root beer, vanilla, cocoa and the like, which are not natural to a conventional base cereal.

As mentioned above, one of the variants of this invention contemplates the addition of appropriate thickening agents to the puffed sugar bodies, such that on the subsequent addition of the sugar bodies to milk or similar fluid those bodies will produce a product closely resembling a milk shake. This "milk shake" base in combination with a base cereal component will produce a tasty, uniquely textured ready-to-eat breakfast cereal. Examples of thickening agents which may be used either alone or in combination with each other in the sugar bodies are methyl cellulose and carboxymethyl cellulose, vegetable gums such as guar, tragacanth, and locust bean gum, gelatins, pectins (both standard and low methoxy), carrageenans, food acids, alginates, dextrins, pregelatinized starch and other hydrophilic colloids. Some of the thickening agents such as some of the alginate derivatives will not readily hydrate in the presence of the calcium ion. Therefore, when these thickening agents are used, a chelating agent such as the conventional citrate and phosphate chelating agents should also be added. Some of the thickeners, notably low methoxy pectin, actually need the presence of calcium ions to perform their thickening function. Others will hydrate without interference from the calcium ions so the presence of chelating agent is not always necessary to produce the thickened type of product described above. The amount of thickening agent required will, of course, vary with the desired actual characteristics of the final product and the particular thickening agent employed. In general, it is desirable that the thickening agent not exceed a level of 10% by weight of the sugar body.

The density of the puffed sugar body is important. With an increase in volume per unit weight, the sugar body increases in frangibility until a point is reached where, during normal handling of the box of the ready-to-eat breakfast cereal, the sugar body will disintegrate. Also if the sugar body is too dense it will not dissolve as well. It is preferred therefore, to maintain the puffed sugar body in the range of between 5 cubic inches per ounce to about 35 cubic inches per ounce. It is most especially preferred to maintain the sugar bodies between 17 cubic inches per ounce and 22 cubic inches per ounce.

Another factor which affects the characteristics of the sugar body is the physical state of the sugar body itself. The sugar bodies may contain sugar existing either in its amorphous state (hereinafter referred to as "glass"), or in its crystalline state. After processing is completed, the final product may also exist in any combination of these two forms. I prefer that sugar bodies be in a partially crystalline state after all the processing is completed. These crystals are preferably essentially microcrystalline in nature. The reason I prefer a partially crystalline state is that because of the extreme hydroscopicity of the "glass" form, sugar bodies in the glass form tend to take up moisture upon storage and may become sticky, shrink, and adhere to each other unless special packaging precautions are taken.

One method for making the puffed sugar bodies consists of mixing sucrose and corn syrup solids in a ratio of from 50 to 98 parts sucrose and from 50 to 2 parts corn syrup thoroughly with water. As mentioned previously, corn syrup is added to control the tendency of a pure sugar to crystallize. It may also be used for sweetness control. This mixture is then slurried and heated to a temperature of between 160 to 190° F. If thickener is desired, it may be added at this point. The slurry is then heated to a temperature of between about 260° F. and about 330° F. to put the sugar into a hard candy or "glass" state. At these temperatures at atmospheric pressure, the sugar mixture has a moisture content of between about 1% and about 7% water, the lower moisture content being at the higher temperature. Cooking can be done of course, in any conventional cooking apparatus such as a steam-jacketed or other heated kettle, tubular heat exchanger or other similar device. The elevated temperature also serves to drive off the moisture. The moisture content is directly related to the sugar temperature at this point. Moisture level is controlled so as to obtain the desired degree of expansion of the sugar bodies.

The sugar mixture is then cooled without agitation to a temperature of less than 200° F., preferably about 190° F. The cooling generally takes place on a cooling slab, a table or a belt having a surface temperature of between 50 and 120° F. As the sugar mixture cools, the viscosity increases and crystal formation which takes place at this point, is slowed. If crystallization is induced before the candy is sufficiently cool, the sugar mixture may crystallize to a very high degree. To prevent this crystallization from taking place, the sugar mixture is allowed to cool quiescently with care taken to avoid the addition of crystal sites. A completely crystallized sugar mixture will not expand upon vacuum puffing. The level of puffing is in fact inversely proportional to the amount of crystallization present in the sugar body at the time the puffing step is commenced.

When sugar mixture has cooled to the desired degree, the flavoring and coloring components are then mixed into the plastic sugar mixture. Thickeners, if they are used, may be added at this point. The flavors and/or thickeners and coloring materials are mixed into the plastic mass by kneading, which may be done either by hand or by mechanical devices suitable for this particular type of mechanical effort. After the kneading step is completed, the flavored sugar mass is then formed into the desired shape, e.g. pellets of about ¼ inch in diameter. The shaping may be done by forming a sugar rope and slicing, or by the use of the drop frame (a device well-known in the candy industry) by a variety of cutting and shaping devices. After forming the desired shape, the shaped material, e.g. pellets, are vacuum puffed. An example of puffing conditions which may be used are a temperature of 170° F. with an absolute pressure of about 5 millimeters of mercury. The vacuum puffing will be affected by the amount of crystallization present before puffing, the temperature of the vacuum puffing step, the level of vacuum drawn, the moisture in the pellets and the other factors previously mentioned. The puffed sugar bodies after vacuum processing are then mixed with the desired base cereal in any desired ratio which may be dependent upon the flavor level in the sugar bodies; a typical ratio being about 45 parts of sugar bodies to 55 parts of cereal, and then the combination is packaged. In general, the ratio of sugar bodies to cereal bodies may be varied within the range of 30:70 to 70:30 parts by weight; preferably 45:55 to 55:45 parts by weight.

Examples of the product of this invention follow. It is obvious that the examples given below are merely illustrative and by on means exhaustive of the variety of combinations possible within the ambit of the teachings of this invention.

EXAMPLE I

The formula for the puffed sugar bodies is as follows:

| Ingredients: | Grams |
|---|---|
| Sugar | 850 |
| Corn syrup (42 D.E.) | 186 |
| Water | 170 |
| Cocoa powder (finely ground solvent extracted low fat) | 100 |
| Vanilla | 1.5 |
| Carboxymethylcellulose | 20 |

The sugar, corn syrup and water were mixed and placed in a steam-jacketed kettle with agitation to produce a slurry which was initially heated to 160° F. The mixture was heated to 280° F. at atmospheric pressure to reduce the moisture level to about 3.5%. The mixture was then poured, without agitation, onto a cooling table having a temperature of 110° F. and was allowed to cool to 180° F. The cocoa powder, vanilla and carboxymethylcellulose were mixed into the plastic mass by kneading. The plastic mass was formed into 3/16 inch diameter pellets by running the mass through a drop frame at a temperature of 155° F. The mixture was then cooled to 100° F. to allow the separation of the individual pieces. The pellets were heated in a vacuum oven set at a temperature of 180° F. and were vacuum puffed at a pressure of 5 millimeters of mercury for 25 minutes. The puffed balls were then mixed and the sugar-coated puffed corn cereal (prepared according to the Collatz patent from degerminated yellow corn meal, wheat starch, and cocoa and sold by General Mills under the trademark Cocoa Puffs). The components were mixed in a ratio of 45 parts by weight of sugar bodies to 55 parts cereal, milk was added and a tasty, chocolate-flavored product was produced with the majority of the flavor being present in the milk and the chocolate level being much more intense than that present in the cereal base.

As a variant of the above example it is possible under the teachings of this invention, to obtain contrasting or complementary flavors by use of different flavors in or on the cereal and in the sugar bodies. For example, sugar bodies of this example can be combined with a vanilla-flavored cereal as a complementary part of the finished ready-to-eat breakfast cereal product. When milk is added to this combination, a chocolate milk shake-like liquid is obtained, with a contrasting vanilla in the base cereal. It should be noted that it is preferred in all the examples where cocoa is used in the sugar bodies for purposes of chocolate flavor that the cocoa be as finely ground as possible for reasons of dispersibility when the puffed sugar body dissolves from the liquid.

EXAMPLE II

The formula for this example is as follows:

| Ingredients: | Grams |
|---|---|
| Sugar | 750 |
| Corn syrup (42 D.E.) | 250 |
| Water | 180 |
| Vanilla | 3 |
| Carrageenan | 10 |

Sugar, corn syrup and water were slurried together as in the preceding example and were then cooked to a temperature of 295° F., the mixture having a moisture level of about 2-2.5%. The mixture was cooled to a temperature of 170° F. on a cooling table set at 106° F. Flavor and thickener were kneaded in together after the product was cooled. Air was then incorporated into the candy on a typical candy puller having two oppositely rotating arms, each attached to one end of the candy mass. The mass then rolled out in an automatic batch roller and sized in a stick sizer to form a 3/16 inch diameter candy rope. The rope was then cut into pieces 3/16 inch long by a cutter. The pieces were then puffed as previously described and mixed with cereal pieces as in the preceding example to produce a combination breakfast cereal which when mixed with milk gave the milk a milk shake-like appearance.

EXAMPLE III

This example illustrates a puffed sugar body wherein the thickener comprised an acid. The ingredients are:

| Ingredients: | Grams |
|---|---|
| Sucrose | 850 |
| Corn syrup (42 D.E.) | 150 |
| Water | 200 |
| Citric acid | 10 |
| Root beer flavor | 1 |

Sucrose, corn syrup and water were mixed together to form a syrup and then heated to 300° F. at which point the moisture level is about 2% by weight of the product. The syrup was then poured on a cooling slab and maintained there until its temperature was between 125 and 150° F. The amorphous mass was then coated with citric acid and root beet flavor. The edges of the mass were folded over to cover this flavoring material and the mass was kneaded. The kneaded product was then formed into generally spherical pieces 5 millimeters in diameter and placed in a vacuum oven where a vacuum of 2 mm. Hg was drawn and the temperature raised to 160° F. where it was held for 1 hour. When the sugar bodies were removed and mixed with milk, the milk was thickened by the acid present in the sugar body. The acid thickening system may, of course, also be combined with a more conventional thickening in whatever proportion is desirable. The citric acid in this example was also a flavoring agent. These sugar bodies were then mixed with a variety of the base cereal pieces to produce a variety of combination breakfast cereals.

The following examples illustrate the preparation of additional sugar bodies which may be used in admixture with any of a wide variety of cereal pieces to produce typical products of the present invention.

EXAMPLE IV

Raspberry-flavored puffed sugar bodies were made as follows:

| Ingredients: | Grams |
|---|---|
| Sucrose | 800 |
| Corn syrup (42 D.E., 43 Bé.) | 200 |
| Water | 160 |
| Red No. 2 Dye | 0.1 |
| Artificial grape color, 50 mg. | |

These ingredients were mixed and heated in an open pan to 300° F. The cooked mixture was then poured onto a 125° F. slab and allowed to cool for 5 minute. Fifteen gm. of citric acid and 1.6 ml. artificial raspberry flavoring were kneaded and pulled into the product. The product was then pelleted and puffed as previously described.

EXAMPLE V

Following essentially the procedures of Example IV, orange-flavored sugar bodies were prepared from the following:

| Ingredients: | Grams |
|---|---|
| Sucrose | 900 |
| Corn syrup (42 D.E., 43 Bé.) | 100 |
| Water | 180 |
| Artificial yellow color | (1) |

For flavoring the following was used:

| | |
|---|---|
| Citric acid | 15 |
| Dried corn syrup (15 D.E.) | 50 |
| Artificial orange flavoring, 1 ml. | |

[1] To suit.

EXAMPLE VI

Strawberry-flavored sugar bodies were prepared from the same basic ingredients in the same proportions set forth in Example IV. The basic sugar composition was flavored with 10 gm. of citric acid and 1 ml. of artificial strawberry flavoring.

As indicated previously, the preceding examples are illustrative of the wide variety of materials and procedures which may be used to produce the products of my invention.

Having fully and completely disclosed the product of my invention, I hereby claim:

1. A ready-to-eat breakfast cereal comprising in combination aliquot, separate base cereal pieces and separate flavor pieces, said flavor pieces comprising a flavoring material incorporated in a partially crystalline, puffed sugar body, and flavor piece component having a density of between 5 cubic inches per ounce and 35 cubic inches per ounce and being readily soluble and dispersible whereby flavoring and sweetness is imparted to milk when milk is combined with the ready-to-eat breakfast cereal.

2. The product of claim 1 where the bulk density of the flavor piece component is between about 17 and 22 cu. in./oz.

3. The product of claim 1 where the flavor piece component contains a thickener in a dispersible form whereby when milk is added to the ready-to-eat cereal a milk shake appearance is imparted to the milk.

4. The product of claim 1 where the base cereal piece component is also flavored.

5. The product of claim 1 where the flavor piece component and the base cereal piece component are present in ratios of from about 30:70 to 70:30 parts by weight.

6. The product of claim 1 where the flavor piece component and the base cereal piece component are present in ratios of from about 45:55 to 55:45 parts by weight.

7. The product of claim 1 where the sugar of the flavor piece component is crystalline.

References Cited
UNITED STATES PATENTS

| | | | |
|---|---|---|---|
| 3,561,981 | 2/1971 | Roe et al. | 99—83 |
| 3,419,402 | 12/1968 | Laskin | 99—199 |
| 3,464,834 | 9/1969 | Laskin | 99—199 |
| 3,472,663 | 10/1969 | Laskin | 99—199 |
| 3,483,000 | 12/1969 | Laskin | 99—134 |
| 3,325,295 | 6/1967 | Vande Ven | 99—134 |

RAYMOND N. JONES, Primary Examiner